(12) United States Patent
Funakawa

(10) Patent No.: US 11,388,295 B2
(45) Date of Patent: Jul. 12, 2022

(54) OPERATION INPUT DEVICE AND IMAGE FORMING APPARATUS

(71) Applicant: KONICA MINOLTA, INC., Tokyo (JP)

(72) Inventor: Hisataka Funakawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/307,258

(22) Filed: May 4, 2021

(65) Prior Publication Data

US 2021/0385344 A1 Dec. 9, 2021

(30) Foreign Application Priority Data

Jun. 4, 2020 (JP) .............................. JP2020-097397

(51) Int. Cl.
| | | |
|---|---|---|
| *H04N 1/00* | (2006.01) | |
| *G06F 3/038* | (2013.01) | |
| *G06F 3/0354* | (2013.01) | |
| *G06F 3/01* | (2006.01) | |

(52) U.S. Cl.
CPC ......... *H04N 1/00405* (2013.01); *G06F 3/016* (2013.01); *G06F 3/038* (2013.01); *G06F 3/03547* (2013.01); *H04N 1/00384* (2013.01)

(58) Field of Classification Search
CPC ............ H04N 1/00405; H04N 1/00384; G06F 3/016; G06F 3/03547; G06F 3/038
See application file for complete search history.

(56) References Cited

U.S. PATENT DOCUMENTS

| | | | | |
|---|---|---|---|---|
| 2014/0292691 A1* | 10/2014 | Sugiyama | ............. | G06F 3/0488 345/173 |
| 2015/0002427 A1* | 1/2015 | Katamoto | ............. | G06F 3/0416 345/173 |
| 2015/0116770 A1* | 4/2015 | Tanaka | ............... | H04N 1/00488 345/173 |
| 2015/0346666 A1* | 12/2015 | Tanaka | ............... | G03G 15/5016 399/24 |

FOREIGN PATENT DOCUMENTS

JP  2009230424 A  10/2009

* cited by examiner

*Primary Examiner* — Moustapha Diaby
(74) *Attorney, Agent, or Firm* — Buchanan Ingersoll & Rooney PC

(57) ABSTRACT

An operation input device includes: an operation panel unit which receives an operation input by a user touching a displayed operation key; a vibrating element installed at a specified position of the operation panel unit to vibrate the unit at least in one direction; and a vibration control section which causes the element to vibrate according to an operation input receiving condition on the panel unit. On the panel unit, operation keys are arranged more densely in a first region near the installed vibrating element than in a second region remote from the vibrating element, or keys which are more frequently used are arranged in the first region than in the second region. Alternatively, an operation key for user interfacing to set display of keys is arranged in the first region.

7 Claims, 12 Drawing Sheets

OPERATION INPUT DEVICE AND IMAGE FORMING APPARATUS

CROSS-REFERENCE TO RELATED APPLICATIONS

The entire disclosure of Japanese Patent Application No. 2020-97397, filed on Jun. 4, 2020, is incorporated herein by reference in its entirety.

BACKGROUND

Technological Field

The present invention relates to an operation input device and an image forming apparatus and more particularly to a technique which vibrates a portion of a device operation unit.

Description of the Related Art

In the past, in mobile terminals such as smart phones, various models which give notice by vibration as a response to operation of a touch panel or the like have been put into practical use. Specifically, a vibrating element called a vibrator is built in a mobile terminal and as a response to a touch detected on the touch panel, the mobile terminal is vibrated by the vibrating element for a preset time period to give a response to operation by the user holding the mobile terminal, by vibration.

In the case of a mobile terminal such as a smart phone, since the user holds the mobile terminal when operating it, the vibration generated by the vibrating element is directly transmitted to the hand Therefore, the area which is vibrated by the vibrating element is irrelevant to the pressed (touched) position on the touch panel and the vibration has only to be uniformly transmitted to the hand holding the terminal. Generally, the back surface of the terminal is vibrated strongly.

Japanese Unexamined Patent Application Publication No. 2009-230424 (Patent Literature 1) describes a technique in which, in a tactile presentation device with a touch panel, the touch panel is divided into a plurality of regions and the regions are vibrated with different vibration intensities.

Patent Literature 1: Japanese Unexamined Patent Application Publication No. 2009-230424

SUMMARY

In the recent years, in stationary machines such as digital multifunctional machines too, models with a touch panel have become widely used. For such stationary machines, a technique which uses a vibrating member to give a response to operation by the user touching the touch panel has also been proposed. However, in the case of a stationary machine like a digital multifunctional machine, the way in which vibration is transmitted to the finger is different from when vibration is transmitted to the hand holding a mobile terminal and only the finger which has touched the touch panel is vibrated, so it is difficult to give a response by vibration with an adequate intensity.

In other words, when a vibration response is given to the user having done a touch operation, by vibrating the touch panel itself, the vibration may fail to be transmitted to the touching finger, which means that depending on the vibration condition, vibration is hardly transmitted to the finger.

In addition, in a stationary machine like a digital multifunctional machine, various components are densely arranged inside the machine and in some cases, a vibrating element of an adequate size cannot be installed in the most suitable position for vibration of the touch panel. In order to transmit vibration to the finger strongly, a relatively large vibrating element which provides a strong vibration force must be installed, but there is a case that it is difficult to install a large vibrating element due to the condition in which components are arranged in the machine.

In such a case, vibration of the touch panel may be insufficient.

Although Japanese Unexamined Patent Application Publication No. 2009-230424 (Patent Literature 1) describes a technique which changes the intensity of vibration of the touch panel from one region of the panel to another, in the case of a stationary machine, depending on the size and installation condition of the vibrating element it may be very difficult to control the intensity of vibration of the touch panel adequately. Therefore, it is practically difficult to control the intensity of vibration adequately for the regions of the panel in a plurality of steps, as described in Japanese Unexamined Patent Application Publication No. 2009-230424 (Patent Literature 1).

The present invention has an object to provide an operation input device and an image forming apparatus which can present a response by vibration to the user having operated a touch panel even when a vibrating element with a low driving force is used.

To achieve at least one of the abovementioned objects, according to an aspect of the present invention, an operation input device reflecting one aspect of the present invention comprises: an operation panel unit which is attached to a device main body and receives an operation input made by a user touching a displayed operation key; a vibrating element which is installed at a specified position of the operation panel unit and vibrates the operation panel unit at least in one direction; and a vibration control section which causes the vibrating element to vibrate according to an operation input receiving condition on the operation panel unit.

On the operation panel unit, the operation keys are arranged more densely in a first region near to the position of the installed vibrating element than in a second region remote from the position of the installed vibrating element.

Alternatively, on the operation panel unit, the operation keys which are more frequently used are arranged in a first region near to the position of the installed vibrating element than in a second region remote from the position of the installed vibrating element.

Alternatively, on the operation panel unit, a first region near to the position of the installed vibrating element and a second region remote from the position of the installed vibrating element are set and an operation key for user interfacing to set display of operation keys is arranged in the first region.

To achieve at least one of the abovementioned objects, according to another aspect of the present invention, an image forming apparatus reflecting another aspect of the present invention comprises: an image forming section which performs image formation processing on a printing medium; an operation panel unit which displays an operation key and receives an operation input by a user touching the operation key related to the image formation processing; a vibrating element which is installed on the operation panel unit and vibrates the operation panel unit at least in one direction; and a vibration control section which causes the vibrating element to vibrate according to an operation input receiving condition on the operation panel unit.

On the operation panel unit, the operation keys are arranged more densely in a first region near to the position of the installed vibrating element than in a second region remote from the position of the installed vibrating element.

According to the present invention, by associating the position of the vibrating element with the position of a key displayed on the operation panel unit, even when the driving force of the vibrating element is small, a vibration response can be infallibly transmitted to a specific operation key to which the vibration response should be transmitted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments. In the embodiments described below, the same elements are designated by the same reference signs and repeated description thereof is omitted.

First Embodiment

Figure 1:
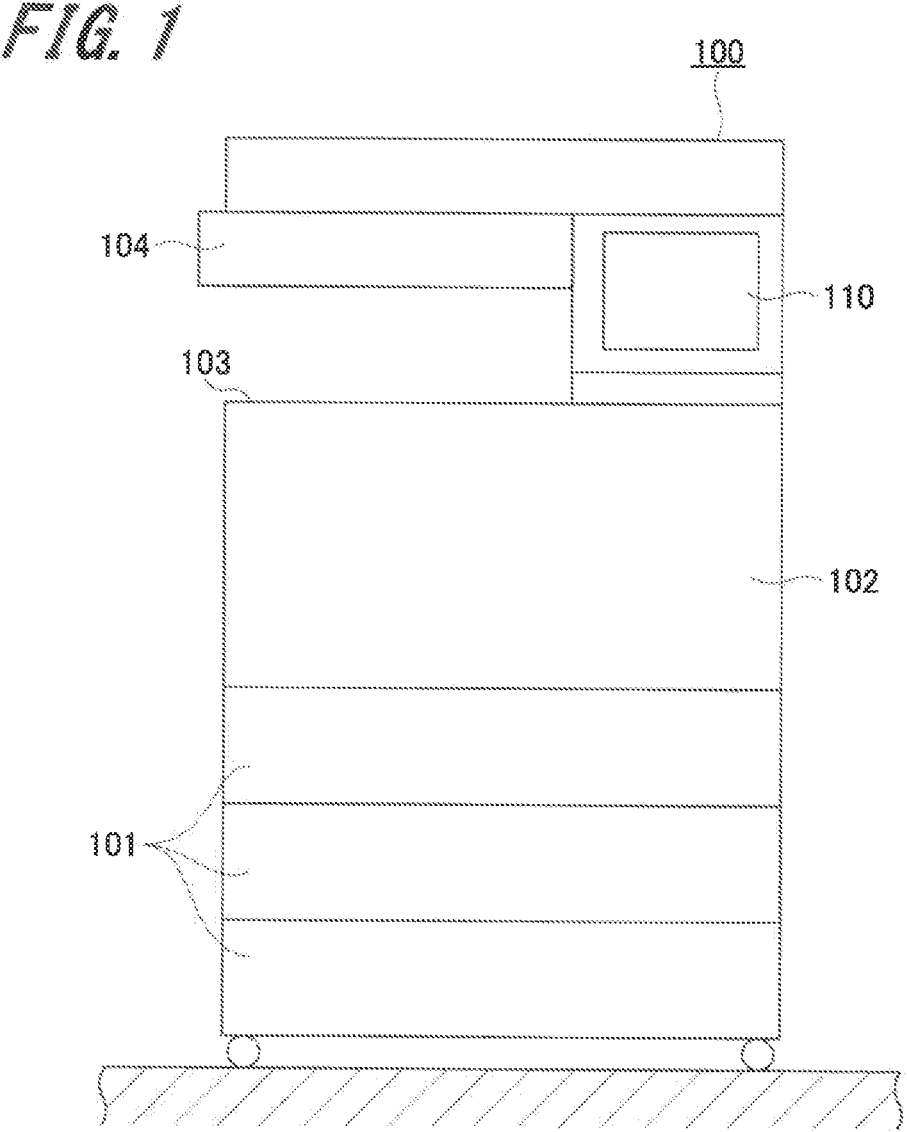
FIG. 1 is a configuration diagram which shows an example of an image forming apparatus according to a first embodiment of the present invention.

The first embodiment of the present invention will be described with reference to FIG. 1 to FIG. 11. FIG. 1 shows an example of an image forming apparatus 100 according to this embodiment. The image forming apparatus 100 according to this embodiment is a digital multifunctional machine called MFP (Multi-Function Peripheral).

The image forming apparatus 100 includes a paper cassette 101, an image forming section 102, a paper delivery section 103, an original reader 104, and an operation panel unit 110.

The image forming section 102 performs image formation processing to form an image of the original read by the original reader 104 or an image of the original transmitted from outside, on the front or back surface of a sheet of paper transported from the paper cassette 101.

The sheet on which the image is formed in the image forming section 102 is delivered from the paper delivery section 103.

The operation panel unit 110 is an operation section with which various settings for image formation processing are made and an instruction to start image formation is given. The operation panel unit 110 includes a liquid crystal display panel to display various operation buttons and the like, and a touch panel which detects a touch of the panel surface. The liquid crystal display panel is a relatively large panel which measures, for example, 10 cm in height and 20 cm in width or so.

The operation panel unit 110 according to this embodiment has the function for the panel itself to vibrate as a response to operation. The function to vibrate will be described later.

Figure 2:
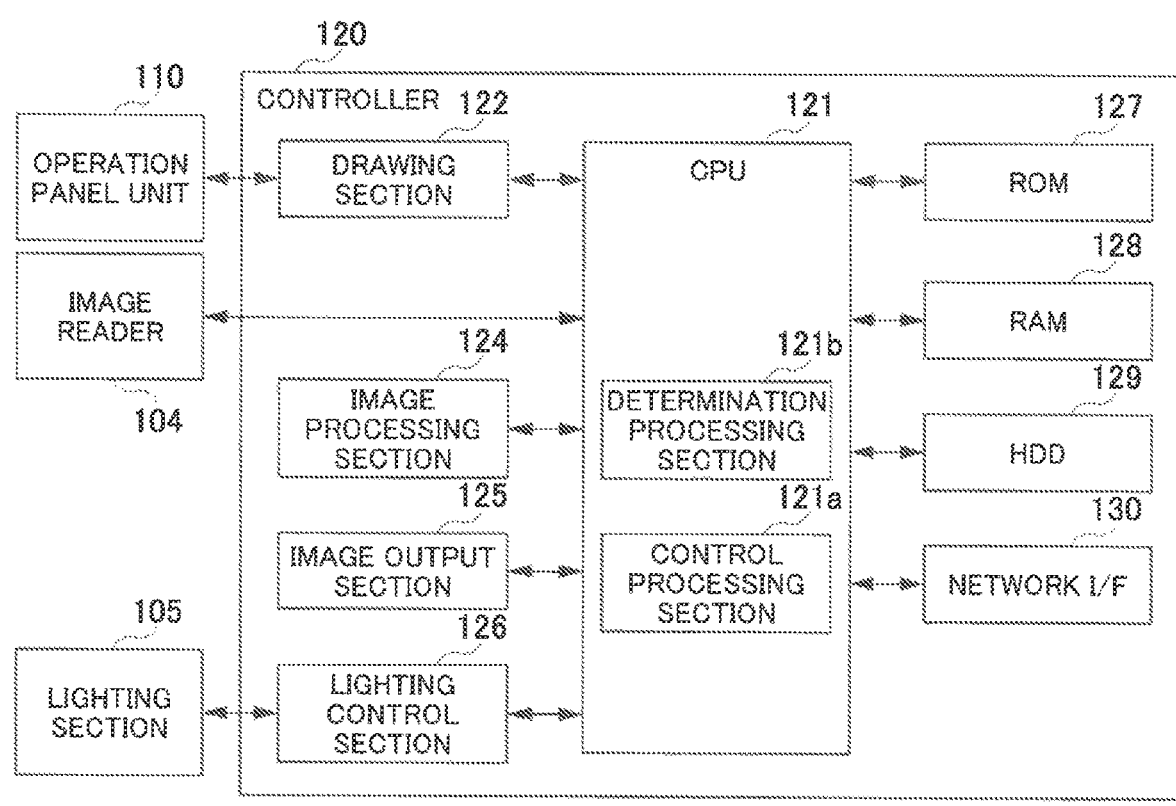
FIG. 2 is a block diagram which shows an example of the control configuration of the image forming apparatus according to the first embodiment of the present invention.

FIG. 2 shows an example of the configuration of a controller 120 of the image forming apparatus 100. Image formation processing by the image forming apparatus 100 is performed under the control by the controller 120 built in the image forming apparatus 100.

The controller 120 includes a central processing unit (hereinafter called "CPU") 121, a drawing section 122, an image processing section 124, an image output section 125, and a lighting control section 126. The controller 120 also includes a ROM 127, a RAM 128, a hard disk drive (hereinafter called "HDD") 129, and a network interface 130.

The CPU 121 reads a program and data required for control from the ROM 127, RAM 128 or HDD 129 connected to it and performs control processing to form an image By execution of the read program, a control processing section 121a which performs the control processing function is formed in the CPU 121. Also, by execution of the read program, a determination processing section 121b which performs the function to determine the state of each section of the image forming apparatus 100 is formed in the CPU 121.

The ROM 127 and RAM 128 are used to store data temporarily and the HDD 129 is mainly used to store image data (original data).

The network interface 130 connected to the CPU 121 receives original data or the like from outside. Communication with a monitoring department responsible for monitoring the operation condition of the image forming apparatus 100 is also made through the network interface 130.

The CPU 121 performs image formation processing for the original read by the original reader 104 or the original received by the network interface 130. Here, the CPU 121 is connected to the image processing section 124 and the image processing section 124 performs processing for correction or treatment of an image obtained from the original data. The image data processed by the image processing section 124 is output from the image output section 125 and image formation is performed by the image forming section 102 (FIG. 1).

In addition, the CPU 121 is connected to the drawing section 122. According to an instruction from the CPU 121, the drawing section 122 draws an operation screen which is to appear on the operation panel unit 110.

The operation panel unit 110 displays the operation screen drawn by the drawing section 122.

In addition, the CPU 121 is connected to the lighting control section 126. The lighting control section 126 controls lighting of the screen of the operation panel unit 110 according to an instruction from the CPU 121.

Figure 3:
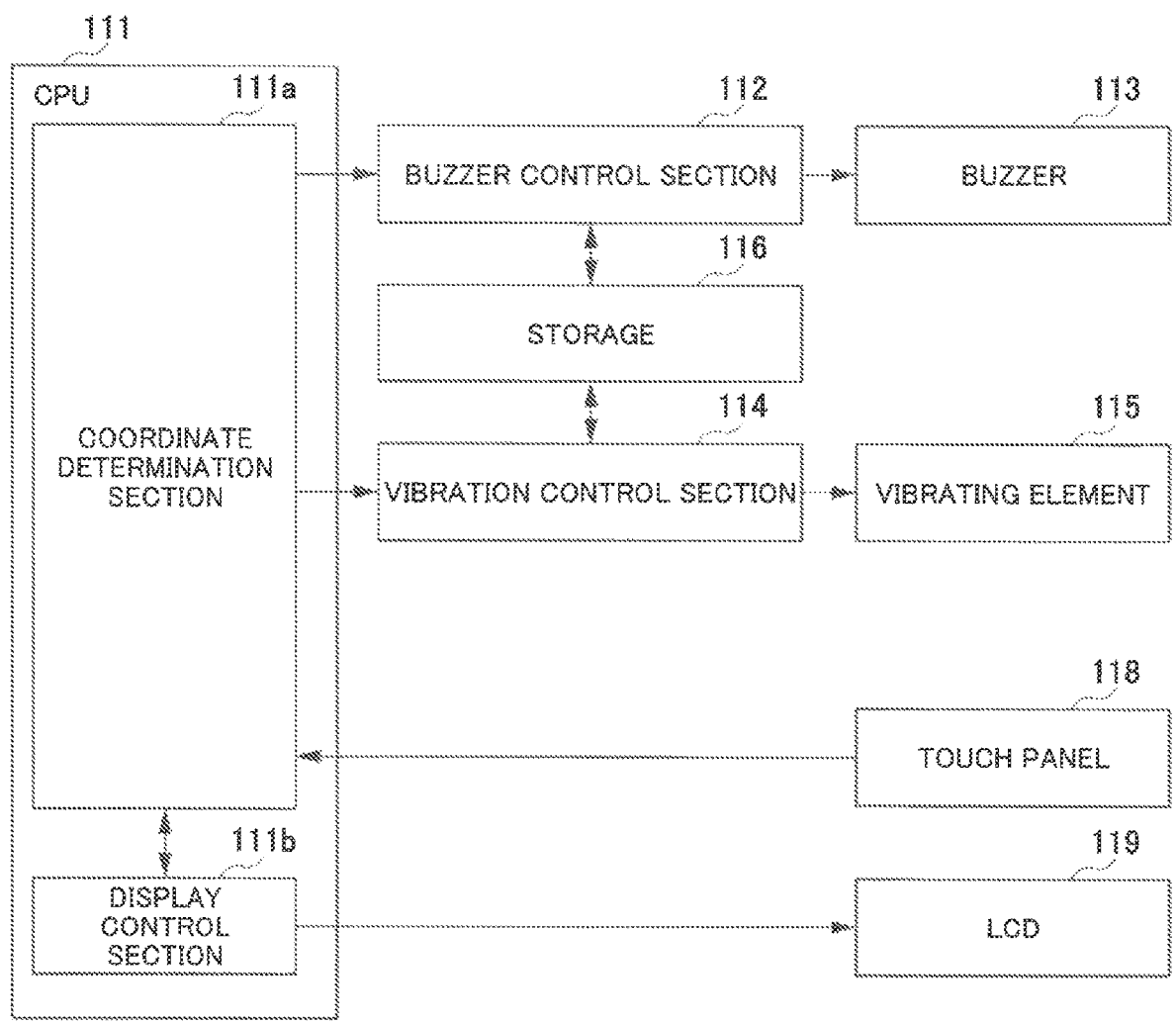
FIG. 3 is a block diagram which shows an example of the configuration of the operation unit according to the first embodiment of the present invention.

FIG. 3 shows the control configuration of the operation panel unit 110.

The operation panel unit 110 includes a CPU 111, a touch panel 118, and a liquid crystal display panel 119. The touch panel 118 detects a touch on the surface of the display screen of the liquid crystal display panel 119. The CPU 111 controls the detection of a touch on the touch panel 118 and the display on the liquid crystal display panel 119.

The CPU 111 includes a coordinate determination section 111a which determines the coordinate position where the touch panel 118 has been touched and a display control section 111b which controls the display of the liquid crystal display panel 119. The display control section 111b controls the display on the liquid crystal display panel 119 according to the image data supplied from the drawing section 122 (FIG. 2) of the controller 120 of the image forming apparatus 100.

The operation panel unit 110 includes a buzzer 113 and a vibrating element 115.

The buzzer 113 emits various types of sound such as a warning sound under the control by a buzzer control section 112. The type of sound to be emitted and correction of the sound volume are set according to the data stored in a storage 116. The buzzer control section 112 controls output of a warning sound according to an instruction from the CPU 111.

The vibrating element 115 vibrates the touch panel 118 and the liquid crystal display panel 119 under the control by a vibration control section 114. Data such as the type of vibration for the touch panel 118 and the liquid crystal display panel 119 and the amount of correction of vibration is stored in the storage 116. The vibration control section 114 reads the data stored in the storage 116 to control the vibration condition according to an instruction from the CPU 111.

In the configuration shown in FIG. 3, the CPU 111 and the vibration control section 114 are separate from each other, but instead the CPU 111 may have the function as the vibration control section 114 so that the CPU 111 directly controls the vibrating element 115.

Figure 4:
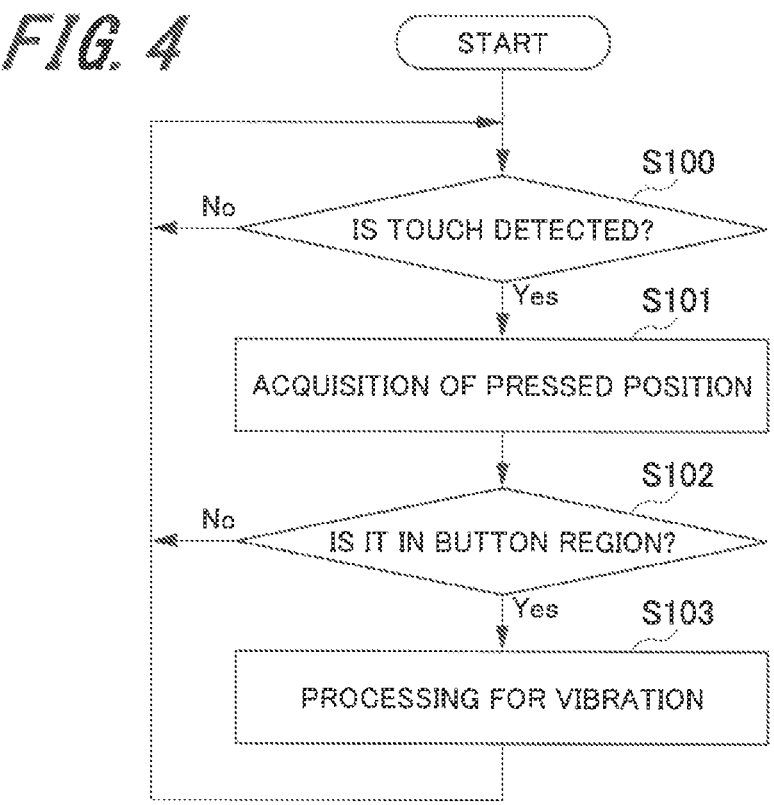
FIG. 4 is a flowchart which shows an example of control by the vibration control section according to the first embodiment of the present invention.

FIG. 4 is a flowchart which shows an example of the process for the CPU 111 of the operation panel unit 110 to cause the vibrating element 115 to vibrate.

First, the CPU 111 decides whether or not the touch panel 118 has been pressed (touched) or not (Step S100). Here, if the CPU 111 detects, for example, an interrupt signal from the touch panel 118, the CPU 111 decides that it has been pressed.

If there is no touch (No at Step S100), any step for vibration is not carried out and this decision step is repeated until a touch is detected at Step S100.

Then, when a touch is detected at Step S100 (Yes at Step S100), the CPU 111 acquires the position on the touch panel 118 where the touch has been made (Step S101). Further, a decision is made as to whether or not the pressed position (touched position) acquired at Step S101 is an operation key region displayed on the liquid crystal display panel 119 (Step S102).

If the pressed position is not in an operation key region (No at Step S102), the CPU 111 goes back to the decision at Step S100 and when a touch is newly made, the same steps are repeated.

If it is decided at Step S102 that the pressed position is in an operation key region (Yes at Step S102), the CPU 111 instructs the vibration control section 114 to perform processing for vibration (Step S103) and goes back to the decision at Step S100 and when a touch is newly made, the same steps are repeated.

As the vibration control section 114 receives an instruction for vibration processing at Step S103, it causes the vibrating element 115 to vibrate for a short time. For example, the vibration control section 114 causes the vibrating element 115 to vibrate only for a short time in the range from 20 ms to 100 ms or so.

Since the vibrating element 115 vibrates for a short time, when the touch panel 118 is touched on an operation key displayed on the liquid crystal display panel 119, vibration is generated as a response to the touch. The touch panel 118 may be touched by the finger of the user as the operator or by a prepared stylus pen.

Next, an explanation will be made of the structure in which the vibrating element 115 vibrates the touch panel 118 and the liquid crystal display panel 119 on the operation panel unit 110 of the image forming apparatus 100 according to this embodiment.

First, before explaining the structure according to this embodiment, a structure with the vibrating element 115 almost in the center of the touch panel 118 and vibrations in that structure will be explained with reference to FIG. 5 to FIG. 8B.

Figure 5:
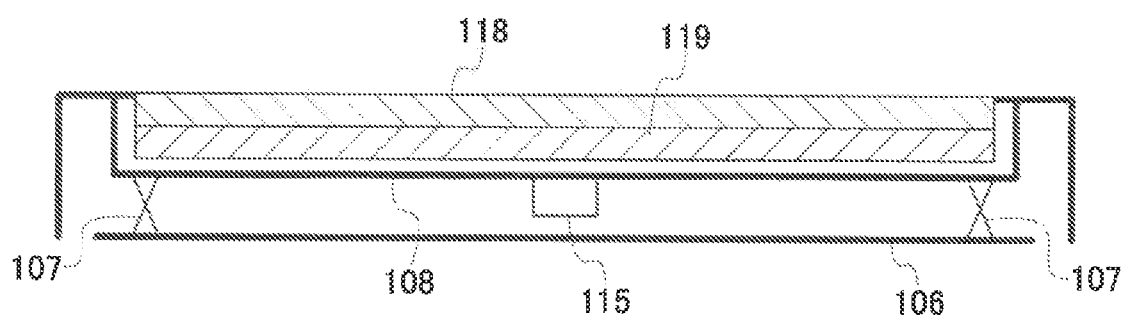
FIG. 5 is a sectional view which shows an example of the structure in which a vibrating element is installed on (the center of) the operation panel unit.

FIG. 5 is a sectional view of the operation panel unit 110 in which the vibrating element 115 is located almost in the center of the touch panel 118.

The touch panel 110 and liquid crystal display panel 119 of the operation panel unit 110 are located over an operation panel holding frame 108. The operation panel holding frame 108 is mounted on an operation panel mounting portion 106 of the housing of the image forming apparatus 100 through a vibration absorbing member 107. The vibration absorbing member 107 is made of rubber, spring or damper and provided at the four corners or the like of the operation panel holding frame 108.

The vibrating element 115 is installed on almost the center of the back of the operation panel holding frame 108. As a drive signal is applied, the vibrating element 115 vibrates the operation panel holding frame 108, touch panel 118, and liquid crystal display panel 119 at least in one direction. For example, a vibration motor with an eccentric weight to the rotation axis of the motor is used for the vibrating element 115.

Figure 6:
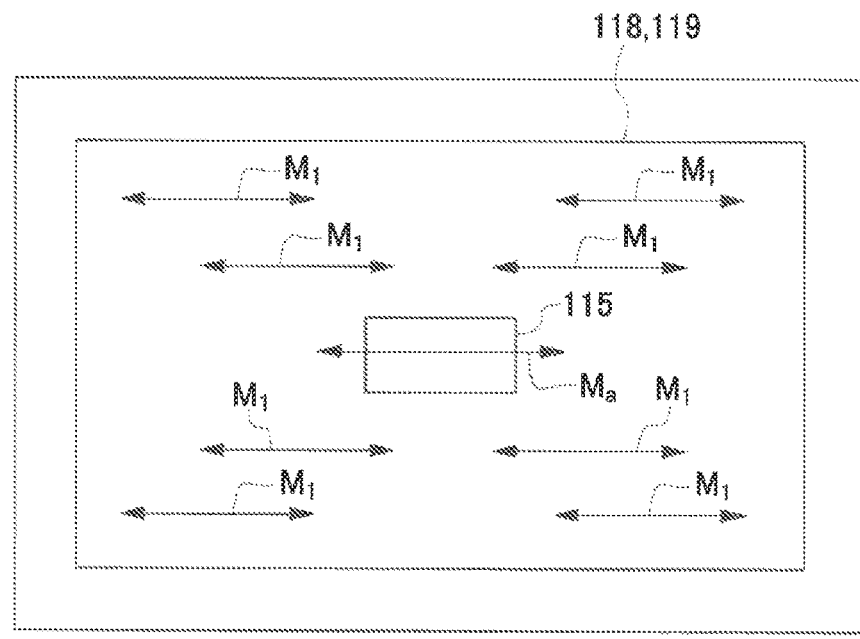
FIG. 6 is a top view of the operation panel unit which shows vibrations in the structure shown in FIG. 5.

FIG. 6 is a view of the installed vibrating element 115 as seen from the surface of the operation panel holding frame 108. The touch panel 118 and the liquid crystal display panel 119 are fitted to the operation panel holding frame 108, and the holding frame 108, touch panel 118, and liquid crystal display panel 119 serve as vibrating members which are vibrated by the vibrating element 115.

For example, the vibrating element 115 is so located as to generate vibration mostly in the horizontal direction (left-right direction in FIG. 6).

When the vibrating element 115 is installed almost in the center as shown in FIG. 6, the vibrating element 115 generates vibration $M_a$ which is transmitted in the horizontal direction (left-right direction). At this moment, vibration $M_1$ is generated with virtually the same vibration amplitude in all the regions of the touch panel 118 and liquid crystal display panel 119 which are fitted to the operation panel holding frame 108. In FIG. 6, an arrow which indicates vibration $M_1$ shows the width of horizontal movement in each region of the panel which is generated by the vibrating element 115.

If a large-sized vibrating element 115 which has a strong driving force to generate a sufficiently large vibration is used, vibration $M_a$ of the vibrating element 115 generates vibration $M_1$ with the same vibration amplitude in all the regions of the touch panel 118.

Figure 7:
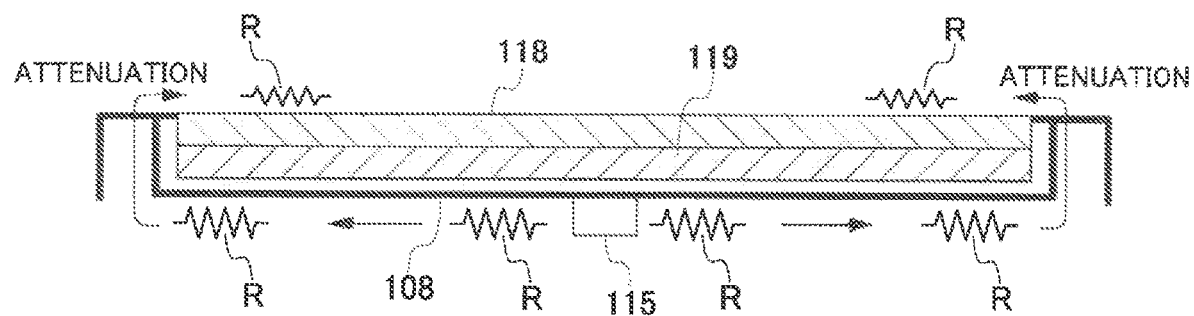
FIG. 7 is a sectional view of the operation panel unit which shows an example of attenuation in the amount of vibration in various portions of the structure shown in FIG. 5.
Figure 8:
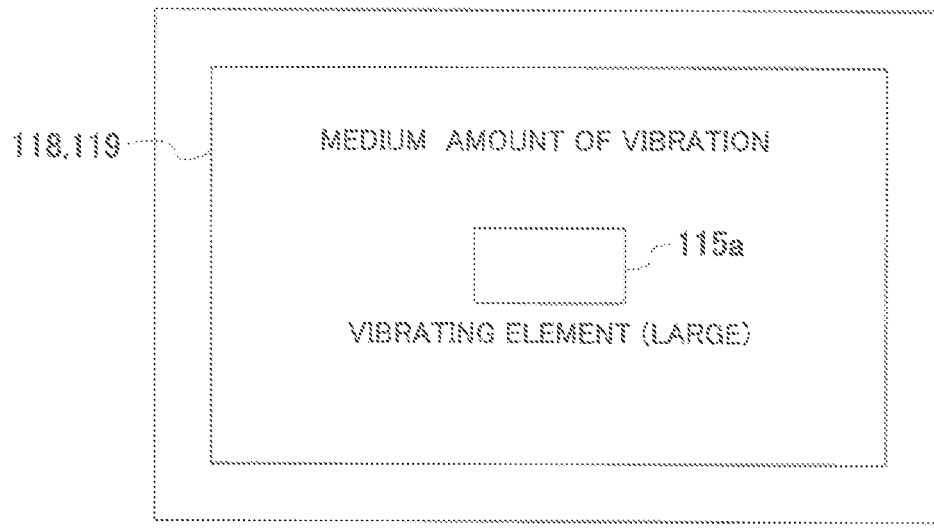
FIGS. 8A and 8B show the relation between the size of the vibrating element and the amount of vibration.
Figure 8:
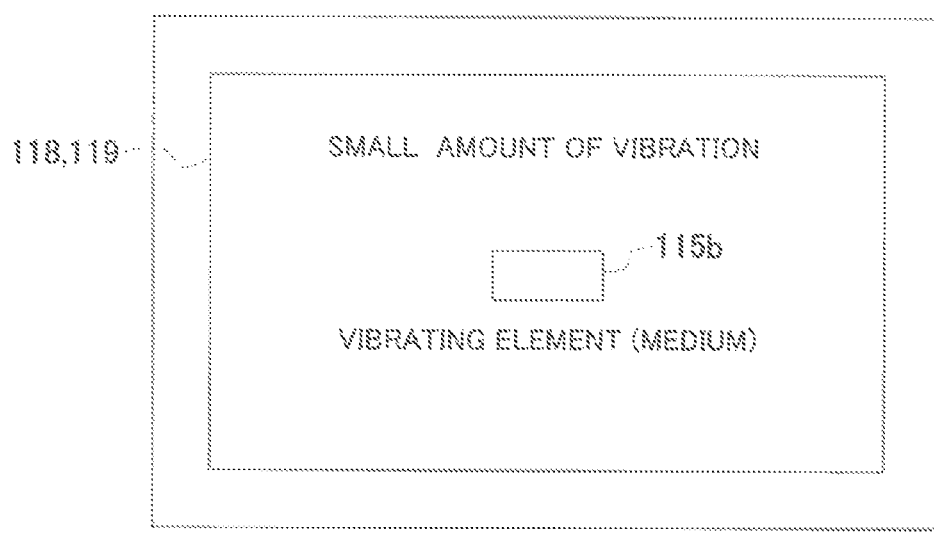

However, actually there are many cases that the touch panel 118 and the liquid crystal display panel 119 are relatively large and the driving force of the vibrating element 115 is not sufficient. In such a case, vibration $M_1$ with the same vibration amplitude is not generated in all the regions. Specifically, as shown in FIG. 7, the touch panel 118, the liquid crystal display panel 119, and the operation panel holding frame 108 holding them function as resistance R which attenuates the amount of vibration and even if the vibrating element 115 generates vibration, vibration is not uniformly generated all over the touch panel 118.

Concretely, let's assume that a large-sized vibrating element 115a with a strong driving force is installed almost in the center of the touch panel 118 as shown in FIG. 8A. In this case, as the vibrating element 115a vibrates the touch panel 118, the amount of vibration in the center region of the touch panel 118 becomes a medium amount of vibration slightly lower than the large amount of vibration generated by the vibrating element 115a. The amount of vibration in the peripheral regions of the touch panel 118 becomes smaller.

Further, let's assume that a medium-sized vibrating element 115b with a slightly weak driving force is installed almost in the center of the touch panel 118 as shown in FIG. 8B. In this case, as the vibrating element 115b vibrates the touch panel 118, the amount of vibration in the center region of the touch panel 118 becomes a small amount of vibration lower than the medium amount of vibration generated by the vibrating element 115b. The amount of vibration in the peripheral regions of the touch panel 118 becomes very small.

As mentioned above, if the size and performance of the vibrating element 115b which can be installed are restricted, when a response is given by vibration upon touching, the vibration condition varies from one region of the touch panel 118 to another.

In this embodiment, operation keys are adequately arranged on the touch panel 118 so that vibration is adequately transmitted to the finger of the user, as explained below.

Next, the structure of the operation panel unit 110 of the image forming apparatus 100 according to this embodiment will be explained with reference to FIG. 9 to FIG. 11.

Figure 9:
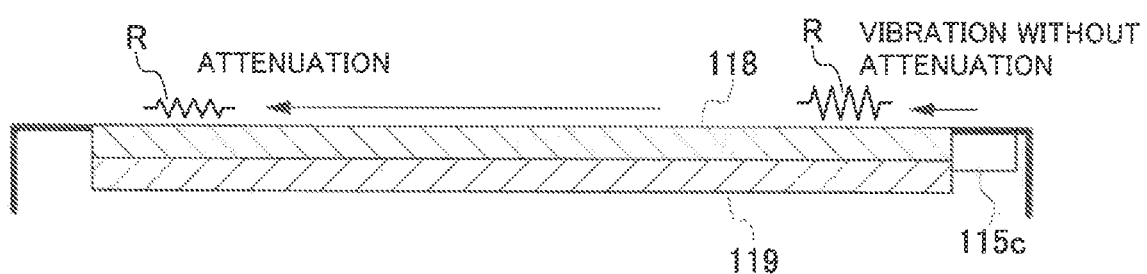
FIG. 9 is a sectional view which shows an example of the operation panel unit according to the first embodiment of the present invention.
Figure 10:
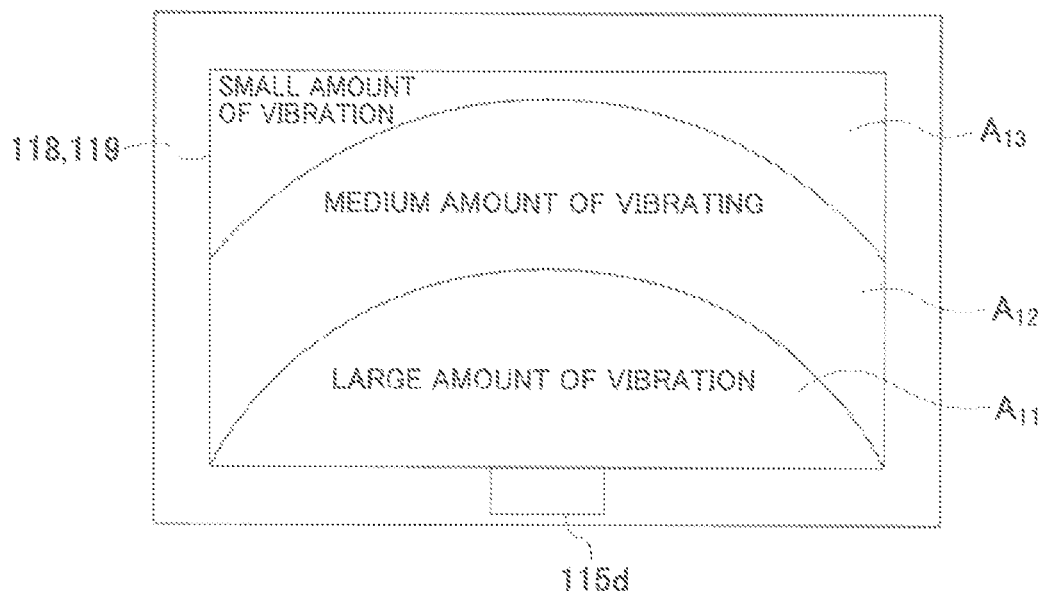
FIGS. 10A and 10B are top views which show examples of vibration amount distributions on the operation panel unit according to the first embodiment of the present invention.
Figure 10:
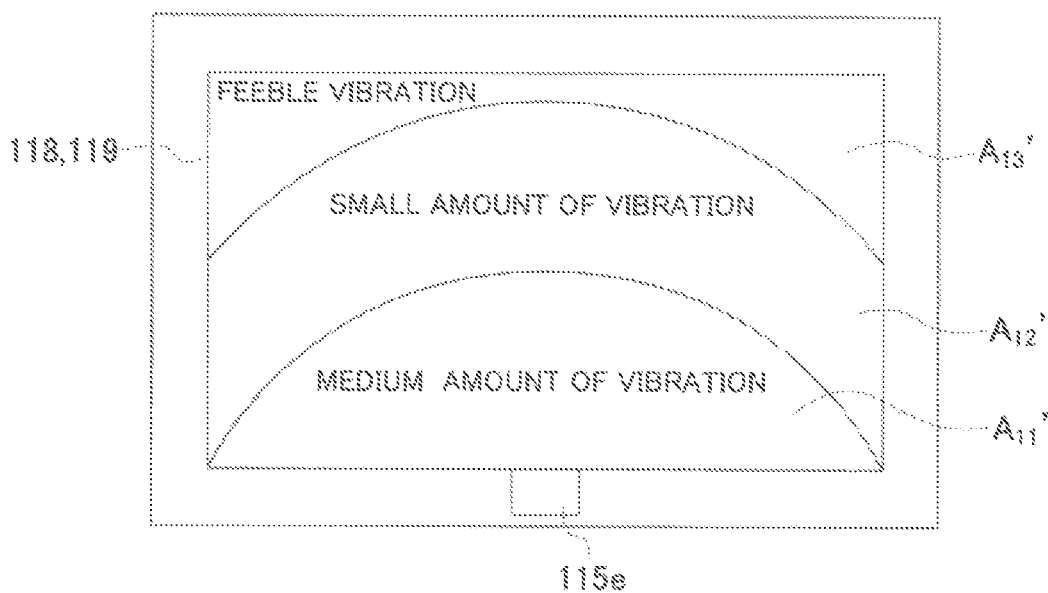

FIG. 9 is a sectional view which shows an example of the operation panel unit 110 according to this embodiment.

The touch panel 118 and the liquid crystal display panel 119 are held by the operation panel holding frame 108. A vibrating element 115c is installed on the touch panel 118 in a manner to contact an end face of the touch panel 118. The vibrating element 115c may be an element which generates a relatively small amount of vibration.

When the vibrating element 115c is installed on the end face of the touch panel 118 as shown in FIG. 9, the vibration from the vibrating element 115c virtually does not attenuate in a region of the touch panel 118 which is near to the end face on which the vibrating element 115 is installed, and the touch panel 118 in the region vibrates relatively strongly. On the other hand, the vibration from the vibrating element 115c attenuates in a region of the touch panel 118 which is remoter from the end face on which the vibrating element 115 is installed, and the touch panel 118 in the region vibrates weakly.

FIGS. 10A and 10B show the positions of installed vibrating elements 115d and 115e and vibrations generated by the vibrating elements 115d and 115e in various regions of the touch panel 118.

FIG. 10A shows an example that a medium-sized vibrating element 115d with a slightly weak driving force is installed in the center of the end face on the lower side of the touch panel 118 and liquid crystal display panel 119.

In the example shown in FIG. 10A, a first region $A_{11}$ nearest in the distance from the vibrating element 115d is a range of a "large amount of vibration" in which vibration is the largest. A second region $A_{12}$ slightly remote in the distance from the vibrating element 115d is a range of a "medium amount of vibration" in which a medium amount of vibration is generated. A third region $A_{13}$ remotest in the distance from the vibrating element 115d is a range of a "small amount of vibration" in which vibration is the weakest. The first region $A_{11}$, second region $A_{12}$, and third region $A_{13}$ are arranged almost concentrically along the direct distance from the vibrating element 115d.

FIG. 10B shows an example that a small-sized vibrating element 115e with a weak driving force is installed in the center of the end face on the lower side of the touch panel 118 and liquid crystal display panel 119.

In the example shown in FIG. 10B, a first region $A_{11}'$ nearest in the distance from the vibrating element 115e is a range of "a medium amount of vibration" in which a medium amount of vibration is generated. A second region $A_{12}'$ slightly remote in the distance from the vibrating element 115e is a range of a "small amount of vibration" in which a small amount of vibration is generated. A third region $A_{13}'$ remotest in the distance from the vibrating element 115e is a range of "feeble vibration" in which vibration is feeble. In the example shown in FIG. 10B too, the first region $A_{11}'$, second region $A_{12}'$, and third region $A_{13}'$ are arranged almost concentrically along the direct distance from the vibrating element 115e.

Figure 11:
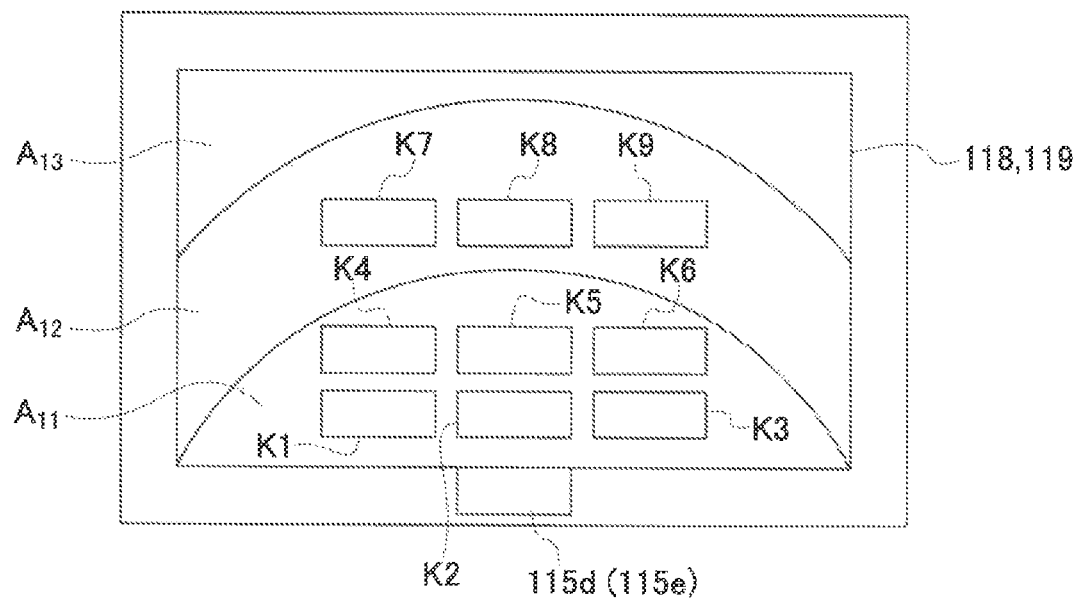
FIG. 11 is a top view of the operation panel unit according to the first embodiment of the present invention which shows an example of arrangement of operation keys.

FIG. 11 shows an example of arrangement of operation keys which are displayed on the liquid crystal display panel 119 when the vibrating element 115d (or 115e) is installed on the operation panel unit 110.

In the example in FIG. 11, the liquid crystal display panel 119 displays nine operation keys K1 to K9.

In this example, the liquid crystal display panel 119 displays six operation keys K1 to K6 which are arranged in the first region $A_{11}$ at relatively short intervals. The liquid crystal display panel 119 also displays three operation keys K7 to K9 which are arranged in the second region $A_{12}$ at longer intervals from the operation keys K1 to K6.

When the touch panel 118 detects a touch on the regions in which the nine operation keys K1 to K9 are displayed, the vibrating element 115d (or 115e) generates vibration for a short time to transmit a response by vibration to the finger of the user.

Among the nine operation keys K1 to K9, the six keys K1 to K6 arranged in the first region $A_{11}$ should be keys which are used relatively frequently and the three operation keys K7 to K9 arranged in the second region $A_{12}$ should be keys which are used less frequently.

In the example in FIG. 11, no keys are arranged in the third region $A_{13}$.

Since the operation keys are arranged as shown in FIG. 11, even though the vibrating element 115d with a medium driving force is used, a vibration response with a relatively large amount of vibration can be transmitted to the finger of the user when any of the operation keys K1 to K6 in the first region $A_{11}$ is touched. Also, when any of the three operation keys K7 to K9 in the second region $A_{12}$ is touched, a vibration response can be transmitted to the finger of the user with a slightly smaller amount of vibration than when any of the operation keys K1 to K6 is touched.

As for the six operation keys K1 to K6 in the first region $A_{11}$, they are arranged at narrower intervals, so they may be operated in a manner that several of them are touched quickly and continuously. Even if the operation keys K1 to K6 are operated in such a manner, a vibration response with a relatively large amount of vibration can be infallibly transmitted to the finger of the user upon touching of each of the operation keys.

On the other hand, as for the three operation keys K7 to K9 in the second region $A_{12}$, they are arranged at wider intervals, so they may be operated in a manner that each operation key is relatively slowly touched by the user. For the operation keys K7 to K9 in the second region $A_{12}$, the vibration for response is weaker than for the operation keys K1 to K6. However, since the operation keys K7 to K9 in the second region $A_{12}$ are operated relatively slowly, even if the vibration for response is weak, the vibration response can be infallibly transmitted to the finger of the user.

Since the operation keys K1 to K6 are used relatively frequently and the operation keys K7 to K9 are used less frequently, from this viewpoint it is highly likely that a vibration response is adequately transmitted to the finger of the user, so the vibration response can be properly transmitted to the finger of the user.

Therefore, the operation panel unit 110 according to this embodiment can transmit a vibration response to the finger of the user in each region adequately and properly even though the installed vibrating element 115d (or 115e) has a medium or small driving force.

Second Embodiment

The second embodiment of the present invention will be described with reference to FIG. 12. In this embodiment, the general structure of the image forming apparatus 100 is the same as the one shown in FIGS. 1 to 4 in the description of the first embodiment. In this embodiment, the arrangement of operation keys of the operation panel unit 110 of the image forming apparatus 100 is different from the one in the first embodiment.

Figure 12:
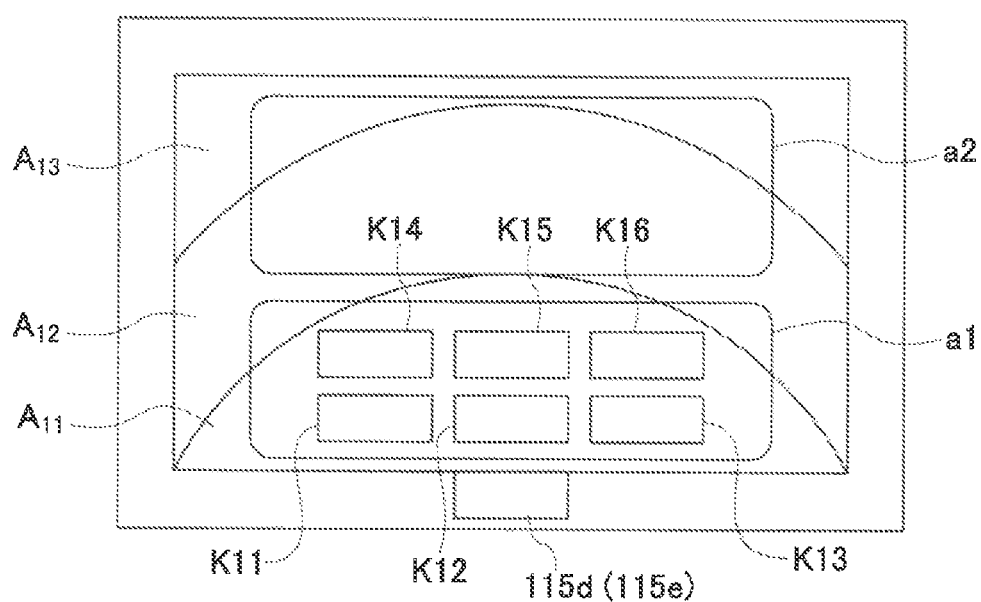
FIG. 12 is a top view of the operation panel unit according to a second embodiment of the present invention which shows an example of arrangement of operation keys.

FIG. 12 shows an example of the structure of the operation panel unit 110 of the image forming apparatus 100 according to this embodiment.

In this embodiment too, the operation panel unit 110 has the vibrating element 115d (or 115e) installed almost in the center of the end face on the lower side of the touch panel 118, as shown in FIG. 12.

Therefore, a first region $A_{11}$, a second region $A_{12}$, and a third region $A_{13}$ are formed concentrically with the position of the installed vibrating element 115d (or 115e) as the center. In the first region $A_{11}$, second region $A_{12}$, and third region $A_{13}$, the amount of vibration gradually becomes smaller as the distance from the vibrating element 115d (or 115e) becomes larger. This is the same as in the first embodiment.

In this embodiment, as the operation keys displayed on the liquid crystal display panel 119, six operation keys K11 to K16 are arranged in an operation area a1 set in the first region $A_{11}$, as shown in FIG. 12. No operation keys are arranged in a non-operation area a2 set in the second region $A_{12}$. In the non-operation area a2, the liquid crystal display panel 119 shows, for example, various types of information such as guidance messages which indicate the operation mode of the image forming apparatus 100 and the machine status.

Since with the arrangement of operation keys as shown in FIG. 12, all the operation keys K11 to K16 are arranged in the first region $A_{11}$, response vibration by the vibrating element 115d (or 115e) is transmitted to the operation keys K11 to K16 with a reasonably large amount of vibration, so the vibration response can be transmitted to the finger of the user properly.

Third Embodiment

The third embodiment of the present invention will be described with reference to FIG. 13. In this embodiment, the general structure of the image forming apparatus 100 is the same as the one shown in FIGS. 1 to 4 in the description of the first embodiment. In this embodiment, the arrangement of operation keys of the operation panel unit 110 of the image forming apparatus 100 is different from the one in the first embodiment.

Figure 13:
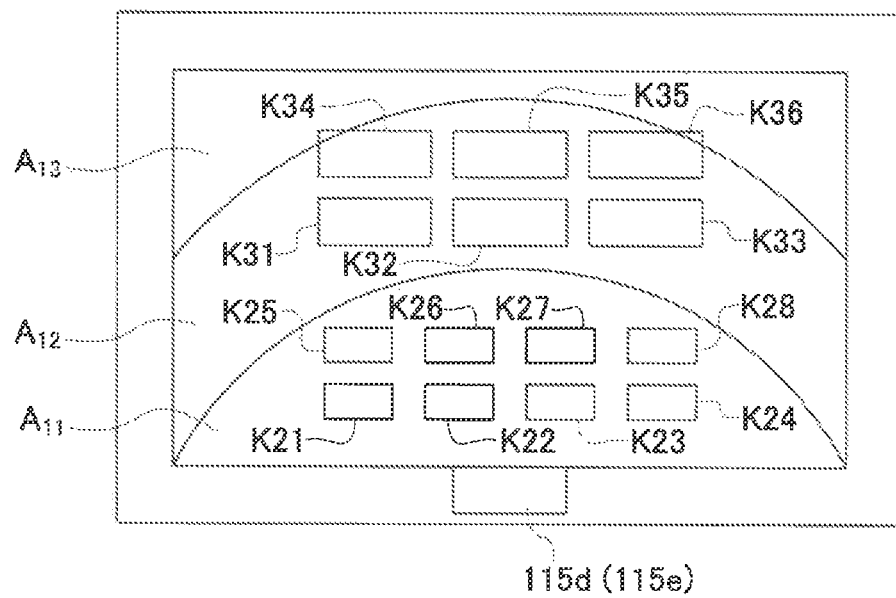
FIG. 13 is a top view of the operation panel unit according to a third embodiment of the present invention which shows an example of arrangement of operation keys.

FIG. 13 shows an example of the structure of the operation panel unit 110 of the image forming apparatus 100 according to this embodiment.

In this embodiment too, the operation panel unit 110 has the vibrating element 115d (or 115e) installed almost in the center of the end face on the lower side of the touch panel 118, as shown in FIG. 13.

Therefore, in this embodiment too, a first region $A_{11}$, a second region $A_{12}$, and a third region $A_{13}$ are formed concentrically with the position of the installed vibrating element 115d (or 115e) as the center. In the first region $A_{11}$, second region $A_{12}$, and third region $A_{13}$, the amount of vibration gradually becomes smaller as the distance from the vibrating element 115d (or 115e) becomes larger.

In this embodiment, as the operation keys displayed on the liquid crystal display panel 119, small-sized operation keys K21 to K28 are arranged in the first region $A_{11}$ and large-sized operation keys K31 to K36 are arranged in the second region $A_{12}$, as shown in FIG. 13.

Since with the arrangement of operation keys as shown in FIG. 13 the small-sized operation keys K21 to K28 are arranged in the first region $A_{11}$, response vibration by the vibrating element 115d (or 115e) is transmitted to the operation keys K21 to K28 with a reasonably large amount of vibration, so the vibration response can be transmitted to the finger of the user properly.

On the other hand, since the large-sized operation keys K31 to K36 are arranged in the second region $A_{12}$, the amount of vibration as a vibration response to them is smaller than to the operation keys K21 to K28.

The small-sized operation keys K21 to K28 are more likely to cause the user to make an operation error such as pressing of a wrong key than the large-sized operation keys. However, the operation keys K21 to K28 are arranged in the first region $A_{11}$, which is near to the vibrating element 115d (or 115e), so a response with a relatively strong vibration is given. Therefore, the arrangement of operation keys shown in FIG. 13 is an arrangement which enables an adequate vibration response to be given with due consideration to the operation keys which are likely to cause an operation error.

Fourth Embodiment

The fourth embodiment of the present invention will be described with reference to FIG. 14. In this embodiment, the general structure of the image forming apparatus 100 is the same as the one shown in FIGS. 1 to 4 in the description of the first embodiment. In this embodiment too, the arrangement of operation keys of the operation panel unit 110 of the image forming apparatus 100 is different from the one in the first embodiment.

Figure 14:
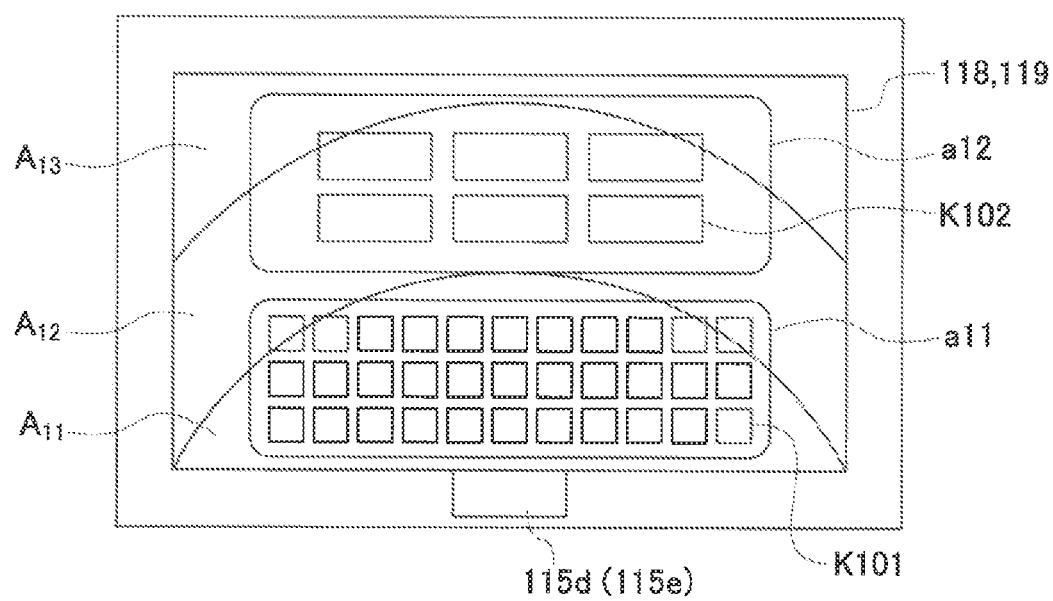
FIG. 14 is a top view of the operation panel unit according to a fourth embodiment of the present invention which shows an example of arrangement of operation keys.

FIG. 14 shows an example of the structure of the operation panel unit 110 of the image forming apparatus 100 according to this embodiment.

In this embodiment too, the operation panel unit 110 has the vibrating element 115d (or 115e) installed almost in the center of the end face on the lower side of the touch panel 118, as shown in FIG. 14.

Therefore, in this embodiment too, a first region $A_{11}$, a second region $A_{12}$, and a third region $A_{13}$ are formed concentrically with the position of the installed vibrating element 115d (or 115e) as the center. In the first region $A_{11}$, second region $A_{12}$, and third region $A_{13}$, the amount of vibration gradually becomes smaller as the distance from the vibrating element 115d (or 115e) becomes larger.

In this embodiment, for the operation keys displayed on the liquid crystal display panel 119, a character string input operation key area a11 is set in the first region $A_{11}$ as shown in FIG. 14. In the character string input operation key area a11, a so-called character string input keyboard K101 with a plurality of operation keys corresponding to characters, numerals, symbols and the like is displayed. On the character string input keyboard K101, a lot of relatively small keys are arranged at narrower intervals.

Also, an operation key area a12 for keys other than character string input keys is set in the second region $A_{12}$. Various operation keys K102 other than character string input keys are displayed in the operation key area a12. As the various operation keys K102, a limited number of relatively large keys are arranged at wider intervals.

In this embodiment, when the character string input keyboard K101 is touched, a vibration response with a relatively large amount of vibration is given and a response to operation of each of the keys arranged at narrower intervals is adequately transmitted to the finger of the user, so character strings can be entered properly.

Fifth Embodiment

The fifth embodiment of the present invention will be described with reference to FIG. 15. In this embodiment, the general structure of the image forming apparatus 100 is the same as the one shown in FIGS. 1 to 4 in the description of the first embodiment. In this embodiment too, the arrangement of operation keys of the operation panel unit 110 of the image forming apparatus 100 is different from the one in the first embodiment.

Figure 15:
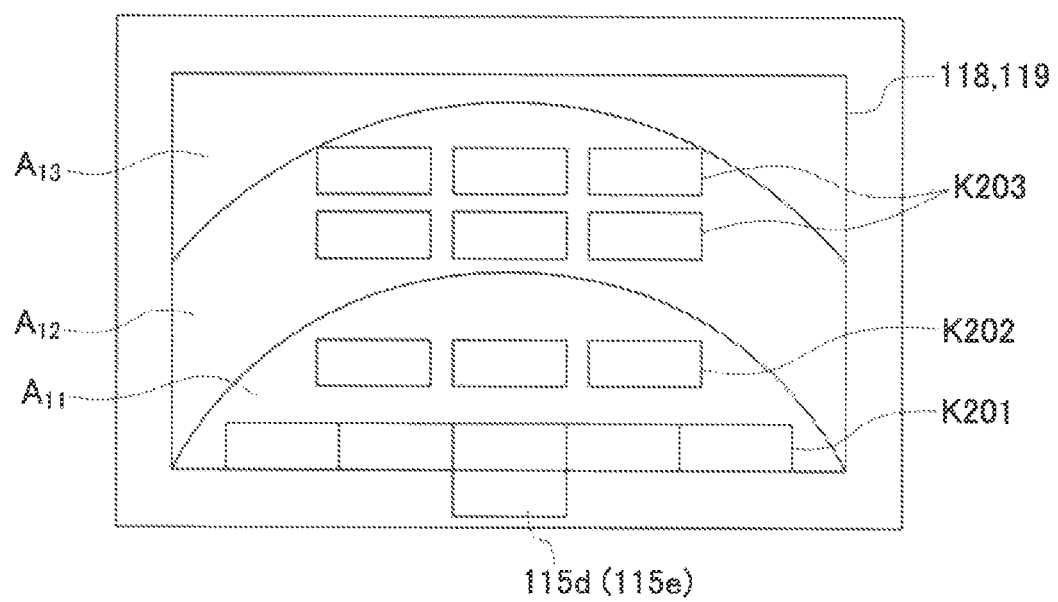
FIG. 15 is a top view of the operation panel unit according to a fifth embodiment of the present invention which shows an example of arrangement of operation keys.

FIG. 15 shows an example of the structure of the operation panel unit 110 of the image forming apparatus 100 according to this embodiment.

In this embodiment too, the operation panel unit 110 has the vibrating element 115d (or 115e) installed almost in the center of the end face on the lower side of the touch panel 118, as shown in FIG. 15.

Therefore, in this embodiment too, a first region $A_{11}$, a second region $A_{12}$, and a third region $A_{13}$ are formed concentrically with the position of the installed vibrating element 115d (or 115e) as the center. In the first region $A_{11}$, second region $A_{12}$, and third region $A_{13}$, the amount of vibration gradually becomes smaller as the distance from the vibrating element 115d (or 115e) becomes larger.

In this embodiment, as the operation keys displayed on the liquid crystal display panel 119, operation keys K201 whose display content is fixed regardless of the operation mode, and operation keys K202 whose display content varies depending on the operation mode are arranged in the first region $A_{11}$, as shown in FIG. 15. Also, operation keys K203 whose display content varies depending on the operation mode are arranged in the second region $A_{12}$.

The operation keys K201 whose display content is fixed are frequently used operation keys and when the operation keys K201 are operated, a vibration response with a relatively large amount of vibration is given and the vibration response is infallibly transmitted to the finger of the user. Also, for the other operation keys K202 arranged in the first region $A_{11}$, a vibration response with a relatively large amount of vibration is given and the vibration response is infallibly transmitted to the finger of the user.

Furthermore, for the operation keys K203 arranged in the second region $A_{12}$, a vibration response is transmitted to the finger of the user with a moderate vibration intensity though the amount of vibration is slightly small.

In this embodiment, when the fixed operation keys K201 which are frequently used as keys for ordinary use are operated, a vibration response is infallibly transmitted to the finger of the user and entry operation can be made properly.

Sixth Embodiment

The sixth embodiment of the present invention will be described with reference to FIG. 16. In this embodiment, the general structure of the image forming apparatus 100 is the same as the one shown in FIGS. 1 to 4 in the description of the first embodiment. In this embodiment too, the arrangement of operation keys of the operation panel unit 110 of the image forming apparatus 100 is different from the one in the first embodiment.

Figure 16:
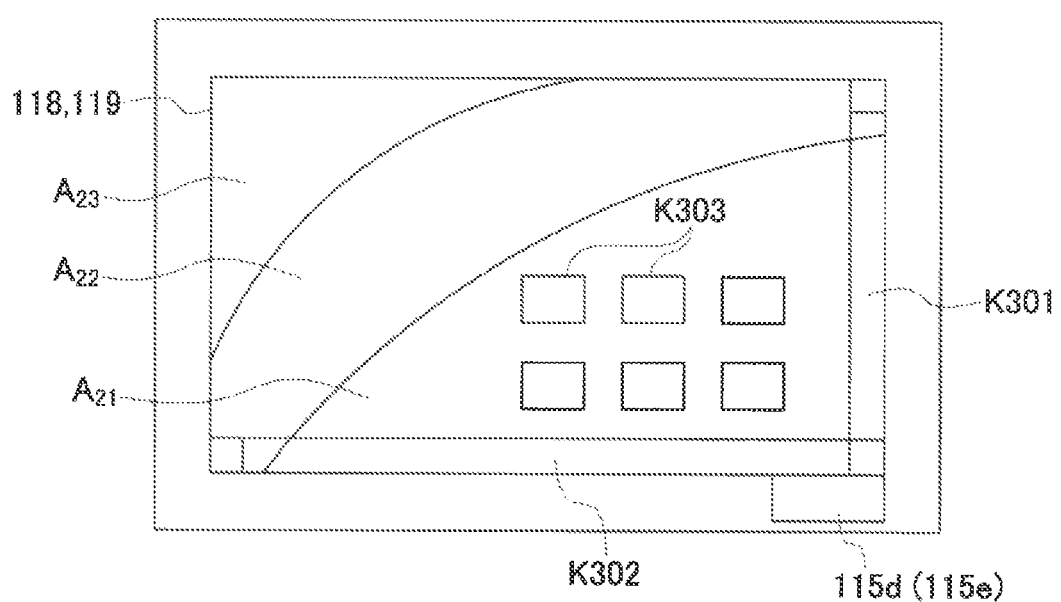
FIG. 16 is a top view of the operation panel unit according to a sixth embodiment of the present invention which shows an example of arrangement of operation keys.

FIG. 16 shows an example of the structure of the operation panel unit 110 of the image forming apparatus 100 according to this embodiment.

In this embodiment, the operation panel unit 110 has the vibrating element 115d (or 115e) installed in the vicinity of the lower right corner of the touch panel 118, as shown in FIG. 16.

In this embodiment, a first region $A_{21}$, a second region $A_{22}$, and a third region $A_{23}$ are formed concentrically with the lower right corner where the vibrating element 115d (or 115e) is installed, as the center. In the first region $A_{21}$, second region $A_{22}$, and third region $A_{23}$, the amount of vibration gradually becomes smaller as the distance from the vibrating element 115d (or 115e) becomes larger.

The vicinity of the right side of the liquid crystal display panel 119 and the vicinity of the lower side mostly constitute the first region $A_{21}$ in which the amount of vibration is the largest. On the other hand, the vicinity of the upper left corner of the liquid crystal display panel 119 constitutes the third region $A_{23}$ in which the amount of vibration is the smallest.

In this embodiment, as the operation keys displayed on the liquid crystal display panel 119, an operation key K301 for scrolling the screen vertically is arranged in the right side corner, and an operation key K302 for scrolling the screen horizontally is arranged in the lower side corner, as shown in FIG. 16. The operation keys K301 and K302 are mostly located in the first region $A_{21}$.

In addition, operation keys K303 for various operations are arranged in the first region $A_{21}$.

With the key arrangement as shown in FIG. 16, when the operation key K301 for scrolling the screen vertically or the operation key K302 for scrolling the screen horizontally is touched, vibration is transmitted to the touching finger with a relatively large amount of vibration, so scrolling can be done with good operability. Furthermore, since the operation keys K303 for various operations are also arranged in the first region $A_{21}$, vibration is transmitted to the touching finger with a relatively large amount of vibration, so a vibration response is given infallibly and good operability is ensured.

Variations

The number of operation keys and the arrangement intervals which have been indicated in the description of the above embodiments are just examples and the present invention is not limited to those shown in the drawings. Some of the various key arrangements in the above embodiments may be combined into an arrangement of operation keys.

For example, the keyboard K101 for entering character strings as shown in FIG. 14 and the operation keys K201 as fixed keys as shown in FIG. 15 may be arranged simultaneously.

In the above embodiments, it is assumed that the operation panel unit of the image forming apparatus as a stationary machine is vibrated. However, the same structure and control processing procedure as in the present invention may be applied to vibration of an operation panel as an input device of any of various other stationary machines.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

100 . . . image forming apparatus,
101 . . . paper cassette,
102 . . . image forming section,
103 . . . paper delivery section,
104 . . . original reader,
105 . . . lighting section,
106 . . . operation panel mounting portion,
107 . . . vibration absorbing member,
108 . . . operation panel holding frame,
110 . . . operation panel unit,
111 . . . central processing unit (CPU),
114 . . . vibration control section,
115, 115a, 115b, 115c, 115d, 115e . . . vibrating element,
117 . . . vibration sensor,
118 . . . touch panel,
119 . . . liquid crystal display,
120 . . . controller

What is claimed is:

1. An operation input device comprising:
an operation panel unit which is attached to a device main body and receives an operation input made by a user touching a displayed operation key;
a vibrating element which is installed at a specified position of the operation panel unit and vibrates the operation panel unit at least in one direction; and
a vibration control section which causes the vibrating element to vibrate according to an operation input receiving condition on the operation panel unit, wherein
on the operation panel unit, the operation keys are arranged more densely in a first region near to the position of the installed vibrating element than in a second region remote from the position of the installed vibrating element.

2. The operation input device according to claim 1, wherein
the operation panel unit has an operable area which displays the operation keys and a non-operable area which does not display the operation keys, and
the operable area is set as the first region and the non-operable area is set as the second region.

3. The operation input device according to claim 1, wherein the operation keys arranged in the first region are smaller in size than the operation keys arranged in the second region.

4. The operation input device according to claim 1, wherein on the operation panel unit, a plurality of the operation keys for entering character strings are arranged in the first region at narrower intervals than a plurality of the operation keys arranged in the second region.

5. An operation input device comprising:
an operation panel unit which is attached to a device main body and receives an operation input made by a user touching a displayed operation key;
a vibrating element which is installed at a specified position of the operation panel unit and vibrates the operation panel unit at least in one direction; and
a vibration control section which causes the vibrating element to vibrate according to an operation input receiving condition on the operation panel unit, wherein
on the operation panel unit, the operation keys which are more frequently used are arranged in a first region near to the position of the installed vibrating element than in a second region remote from the position of the installed vibrating element.

6. An operation input unit comprising:
an operation panel unit which is attached to a device main body and receives an operation input made by a user touching a displayed operation key;

a vibrating element which is installed at a specified position of the operation panel unit and vibrates the operation panel unit at least in one direction; and a vibration control section which causes the vibrating element to vibrate according to an operation input receiving condition on the operation panel unit, wherein on the operation panel unit, a first region near to the position of the installed vibrating element and a second region remote from the position of the installed vibrating element are set and an operation key for user interfacing to set display of the operation keys is arranged in the first region.

7. An image forming apparatus comprising:

an image forming section which performs image formation processing on a printing medium;

an operation panel unit which displays an operation key and receives an operation input by a user touching the operation key related to the image formation processing;

a vibrating element which is installed on the operation panel unit and vibrates the operation panel unit at least in one direction; and a vibration control section which causes the vibrating element to vibrate according to an operation input receiving condition on the operation panel unit, wherein on the operation panel unit, the operation keys are arranged more densely in a first region near to a position of the installed vibrating element than in a second region remote from the position of the installed vibrating element.

\* \* \* \* \*